April 26, 1966   J. MOORE ET AL   3,248,297
METHODS OF OPERATING GAS COOLED NUCLEAR REACTORS
Filed Sept. 2, 1960
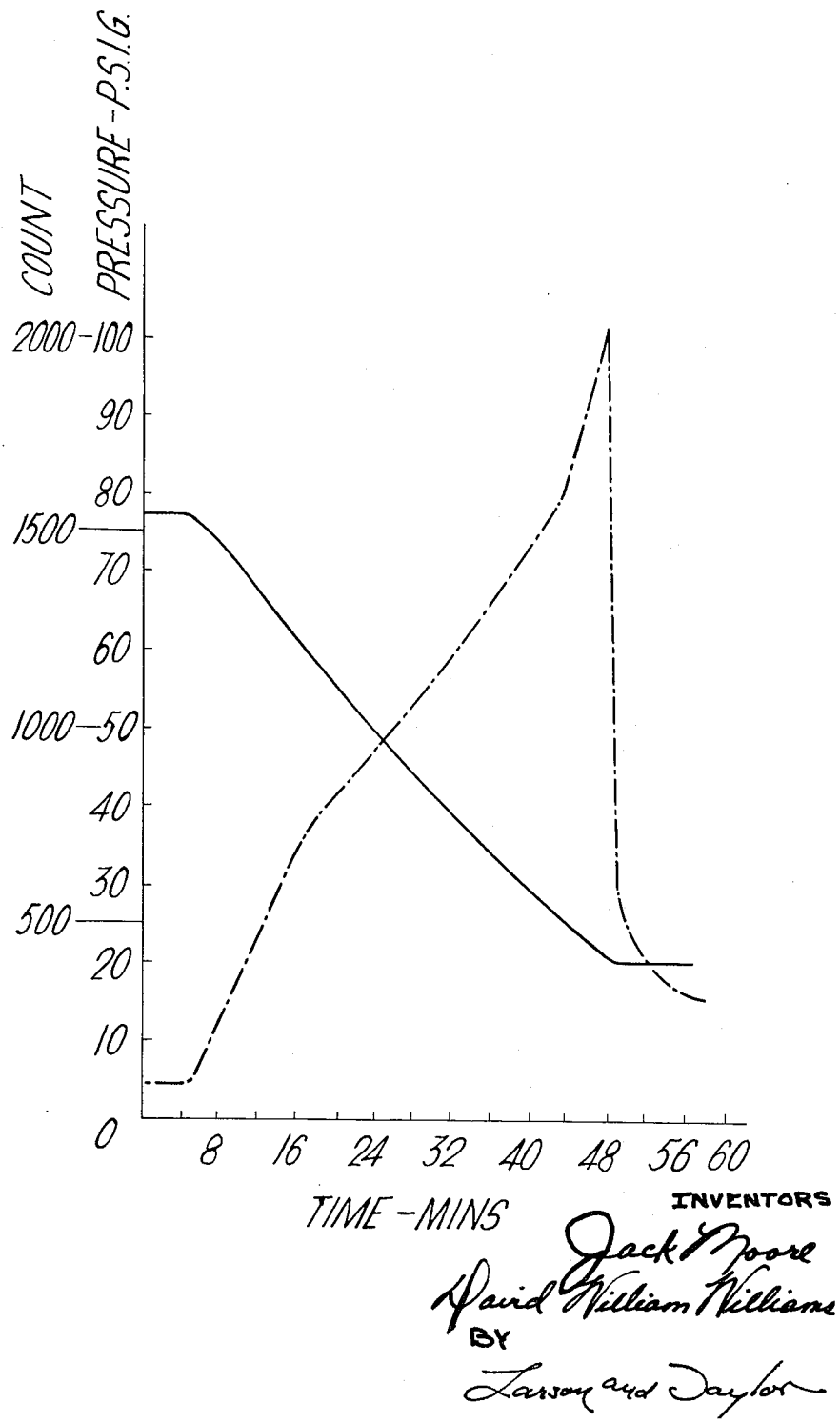
INVENTORS
Jack Moore
David William Williams
BY
Larson and Taylor United States Patent Office 3,248,297
Patented Apr. 26, 1966

3,248,297
METHODS OF OPERATING GAS COOLED
NUCLEAR REACTORS
Jack Moore, Whinthwaite, Seascale, Cumberland, and David William Williams, Seascale, Cumberland, England, assignors to United Kingdom Atomic Energy Authority, London, England
Filed Sept. 2, 1960, Ser. No. 53,785
Claims priority, application Great Britain, Sept. 4, 1959, 30,261/59
2 Claims. (Cl. 176—19)

This invention relates to a method of operating gas cooled nuclear reactors of the kind in which coolant gas is circulated under pressure in a closed circuit, and the fuel elements thereof comprises nuclear fuel members each enclosed in a protective sheath.

In association with such a gas-cooled nuclear reactor it is usual to provide apparatus by which coolant gas passing through the reactor is monitored for the presence of fission products so that failure in the sheaths of fuel elements in the reactor (which leads to the release of fission products into the coolant) may be detected and gross radioactive contamination of the coolant and coolant circuit avoided. Such apparatus is referred to as fuel element leak detector apparatus.

In one known form of fuel element leak detector apparatus the solid daughter products of short lived gaseous fission products are collected on a movable wire or tape under the influence of an electric field and the wire or tape is then moved to a monitor to detect the solid daughter products. However it is possible that the leak path through a fuel element sheath may be so long that back diffusion of the coolant into the fuel element prevents short lived fission products reaching the main coolant stream before they have decayed and hence the leak may escape detection until it has reached major proportions.

According to the present invention a method of operating a nuclear reactor of the kind described and associated with fuel element leak detector apparatus for detecting short lived fission products, comprises the step of reducing the pressure in the coolant circuit whilst the reactor is operating at power whereby fission products are forced through any existing leaks in the fuel element sheaths into the coolant stream for detection by the said detector apparatus.

It is considered that if the coolant pressure is reduced relatively quickly this will change the pressure drop across the sheath and probably also lead to some slight relative movement between the sheath and the fuel member. Both of these effects will tend to squeeze gas containing fission products from inside the sheath into the main coolant stream where they can be detected.

For safety reasons the pressure is preferably reduced while the reactor is operating at low power. The following is an example of a preferred way of carrying the invention into effect of a reactor of the kind described, normally cooled with carbon dioxide at 90 p.s.i.g. and normally operated about 200 MW.

Starting with a de-pressurised, shut-down reactor the reactor is first brought to normal working pressure of 90 p.s.i.g. and the power raised to 5 MW. by withdrawing control rods, the coolant flow being adjusted to give a maximum fuel element sheath temperature of about 200° C. A series of readings are then taken on the fuel element leak detector apparatus for all channels or groups of channels to provide a basis for comparison and to allow time for the pressure inside a leaking fuel element to increase towards the reactor coolant pressure. The reactor coolant gas is then blown off until the pressure in the reactor has dropped to 20 lbs./sq. in., the rate at which the pressure is reduced being between 1 lb. and 2 lb. per sq. in. per min, and sufficiently long to allow the reactor to be scanned completely twice over by the fuel element leak detector apparatus, say about 40 minutes. During the operation reactor power and coolant flow are controlled in such a way that normal channel signals on the fuel element detector apparatus are maintained at an approximately constant level and any abnormally high signal is investigated. After the cause of any high signals on the fuel element leak detector apparatus have been found and removed the reactor is returned to full pressure and normal operation. However if it is not possible to scan the reactor at least twice during blow-down (which should preferably not be carried out at a rate less than 1 lb./sq. in./min.) the whole procedure may be repeated two or three times starting at different points in the scanning cycle each time.

A result to be expected from the operation described above is shown in the attached graph. The full line represents the fall in reactor pressure over the time of the operation and the chain-dotted line represents the rising signal received from a typical leaking fuel element over the same period. The counts on the graph are the counts recorded from each sample fed to the fuel element leak detector apparatus form the channel containing the leaking element. It should be noted how the signal recorded drops again after pressure reduction ceases.

It is calculated that leaks of diameter of about 10 microns, having a leak path of a few centimetres, may be detected by the method of the invention on the known fuel element leak detector apparatus for detecting short-lived fission products.

We claim:
1. A method of operating a gas-cooled nuclear reactor associated with fuel element leak detection apparatus, the reactor having a closed coolant circuit in which the coolant gas circulates under pressure and fuel elements each of which comprise a nuclear fuel member enclosed in a protective sheath; said method comprising the steps of reducing the pressure in the coolant circuit at a rate of at least one pound per square inch per minute while maintaining the reactor at a power of at least five MW and monitoring the coolant for the presence of short-lived fission products forced into the coolant circuit through fuel element sheath leaks by means of said fuel element leak detector apparatus.

2. A method of operating a gas-cooled nuclear reactor associated with fuel element leak detection apparatus, the reactor having a closed coolant circuit in which the coolant gas circulates under pressure and fuel elements each of which comprise a nuclear fuel member enclosed in a protective sheath; said method comprising the steps of reducing the pressure in the coolant circuit from ninety p.s.i.g. to twenty pounds p.s.i.g. at a rate of between one pound and two pounds per square inch per minute while maintaining the reactor at a power of at least five MW. and monitoring the coolant for the presence of short-lived fission products forced into the coolant circuit through fuel element sheath leaks by means of said fuel element leak detector apparatus.

References Cited by the Examiner

UNITED STATES PATENTS 2,751,780   6/1956   Plott.
2,987,459   6/1961   Labeyrie _____ 176—19

OTHER REFERENCES

"Control of Tightness by Liquation of Helium," C. Level de Curnieu (Compagnie Francaise Thomson-Houston, Paris), pp. 197–212 of "VI Rassegna Internazional Electtronica e Nucleare. Atti Del Congresso Scientifico, Giugno 1959. Sezione Nucleare, Vol. I." Rome, Comitato Nazionale Ricerche Nucleari (1959). (In French) as cited in Nuclear Science Abstracts, vol. 14, pp. 1223, 1960.

REUBEN EPSTEIN, *Primary Examiner.*

ROGER L. CAMPBELL, CARL D. QUARFORTH, *Examiners.*

J. F. DAVIS, M. R. DINNIN, *Assistant Examiners.*